US007901057B2

(12) United States Patent
Stephenson, III

(10) Patent No.: US 7,901,057 B2
(45) Date of Patent: Mar. 8, 2011

(54) THERMAL INKJET PRINTHEAD ON A METALLIC SUBSTRATE

(75) Inventor: Stanley W. Stephenson, III, Spencerport, NY (US)

(73) Assignee: Eastman Kodak Company, Rochester, NY (US)

(*) Notice: Subject to any disclaimer, the term of this patent is extended or adjusted under 35 U.S.C. 154(b) by 372 days.

(21) Appl. No.: 12/100,565

(22) Filed: Apr. 10, 2008

(65) Prior Publication Data

US 2009/0258236 A1 Oct. 15, 2009

(51) Int. Cl.
*B41J 2/05* (2006.01)
*G11B 5/127* (2006.01)

(52) U.S. Cl. .......................................... 347/63; 428/432

(58) Field of Classification Search .................... 347/54, 347/56, 63, 65; 428/432
See application file for complete search history.

(56) References Cited

U.S. PATENT DOCUMENTS

| | | | | |
|---|---|---|---|---|
| 4,528,070 | A | 7/1985 | Gamblin | |
| 5,134,425 | A | 7/1992 | Yeung | |
| 6,491,385 | B2 | 12/2002 | Anagnostopoulos et al. | |
| 6,663,221 | B2 | 12/2003 | Anagnostopoulos et al. | |
| 6,722,759 | B2 | 4/2004 | Torgerson et al. | |
| 6,911,666 | B2 | 6/2005 | Voutsas | |
| 6,921,156 | B2 | 7/2005 | Childers et al. | |
| 6,926,384 | B2 | 8/2005 | Grose et al. | |
| 6,969,158 | B2 | 11/2005 | Taira | |
| 2008/0007927 | A1* | 1/2008 | Ito et al. | 361/764 |

* cited by examiner

*Primary Examiner* — An H Do
(74) *Attorney, Agent, or Firm* — William R. Zimmerli

(57) ABSTRACT

A printhead and method of forming the printhead are provided. The method includes forming an ink feed passage through a print head substrate by providing a metallic substrate having a first surface and a second surface; providing an ink ejector structure on a first surface of the metallic substrate; providing a mask over the second surface of the metallic substrate to define the ink feed passage; and forming the ink feed passage from the second surface of the metallic substrate using a liquid etchant.

14 Claims, 8 Drawing Sheets

THERMAL INKJET PRINTHEAD ON A METALLIC SUBSTRATE

CROSS REFERENCE TO RELATED APPLICATIONS

Reference is made to commonly assigned U.S. patent application Ser. No. 11/516,134 filed Sep. 6, 2006, entitled "LARGE AREA ARRAY PRINT HEAD EJECTOR ACTUATION" in the name of Stanley W. Stephenson, the disclosure of which is incorporated herein by reference.

FIELD OF THE INVENTION

This invention relates generally to the field of thermal liquid ejector printheads, and in particular to printheads formed on metallic substrates.

BACKGROUND OF THE INVENTION

Ink jet printing systems apply ink to a substrate. The inks are typically dyes and pigments in a fluid. The ink-receiving substrate can be comprised of a material or object. Most typically, the substrate is a flexible sheet that can be a paper, polymer or a composite of either type of material. The surface of the substrate and the ink are formulated to optimize the ink lay down.

Ink drops can be applied to the substrate by modulated deflection of a stream of ink (continuous) or by selective ejection from a drop generator (drop-on-demand). The drop-on-demand (DOD) systems eject ink using either a thermal pulse delivered by a resistor or a mechanical deflection of a cavity wall by a piezoelectric actuator. Ejection of the droplet is synchronized to motion of the substrate by a controller, which electrical signals to each ejector with appropriate timing to form an image.

U.S. Pat. No. 6,491,385 describes a continuous ink jet head and it's operation. An linear array of ejectors is disposed on a substrate. Each nozzle has a unique supply bore through the substrate. The supply bore ejects fluid through a nozzle in a membrane across the front surface of the supply bore. The membrane supports layers that form a pair of semi-circular resistive elements around each nozzle. Each resistor pair is pulsed to break the stream of fluid into discrete droplets. Asymmetric heating of the resistors can selectively direct the droplets into different pathways. A gutter can be used to filter out select droplets, providing a stream of selected droplets useful for printing. The modulated stream printing system requires significant additional apparatus to manage fluid flow.

Piezoelectric actuated heads use an electrically flexed membrane to pressurize a fluid-containing cavity. The membranes can be oriented in parallel or perpendicular to the ejection direction. U.S. Pat. No. 6,969,158 describes a piezoelectric drop-on-demand ink jet head having an electrically responsive piezo membrane that forces fluids through a nozzle. The ink jet head is formed of a numerous, stacked metallic plates, which includes the piezoelectric membrane. The metallic membranes require a large amount of surface area, and multiple rows of ejectors are arrayed in depth across the head. Ejectors are arranged across the printing direction at a pitch of 50 dpi and are arrayed in the printing direction 12 ejectors deep on an angle theta to form a head having an effective pitch of 600 dpi. Such heads are complex, requiring multiple layers that must be bonded together to form passages to the nozzle. The materials comprising the head and the structures do not lend themselves to incorporating semiconductor switching elements.

U.S. Pat. No. 6,926,384 discloses a piezoelectric drop-on-demand inkjet head permitting single-pass printing. A single pass print head comprises 12 linear array module assemblies that are attached to a common manifold/orifice plate assembly. Droplets are ejected from the orifice by twelve staggered linear array assemblies that support piezoelectric body assemblies to provide drop-on-demand ejection of ink through the orifice array. The piezoelectric system cannot pitch nozzles closely together; in the example, each swath module has a pitch of 50 dpi. The twelve array assemblies are necessary to provide 600 dpi resolution in a horizontally and vertically staggered fashion.

The orifice array on the plate can be a single two-dimensional array of orifices or a combination of orifices to form an array of nozzles. In the printing application, the orifices must be positioned such that the distance between orifices in adjacent line is at last an order of magnitude (more than ten times) the pitch between print lines. The assembly is quite complex, requiring many separate array assemblies to be attached to the orifice plate thorough the use of sub frames, stiffeners, clamp bar, washers and screws. It would be advantageous to provide a staggered array in a unitary assembly with an integral orifice plate. It would be useful for the spacing between nozzles to be less than an order of magnitude deeper than is disclosed in this patent.

U.S. Pat. No. 6,722,759 describes a common thermal drop-on-demand inkjet head structure. The drop generator consists of ink chamber, an inlet to the ink chamber, a nozzle to direct the drop out of the cavity and a resistive element for creating an ink ejecting bubble. Linear arrays of drop generators are positioned on either side of an ink feed passage. Two linear arrays are fed by a common ink feed passage. Ink from the slot passes through a flow restricting ink channels to the ink chamber. A heater resistor at the bottom of the ink chamber is energized to form a bubble in the chamber and eject a drop of ink through a nozzle in the top of the chamber. A matching set of transistors is formed adjacent to each resistor to provide a three-terminal switching device to each resistor. Sets of traces are provided adjacent to the transistors to provide power, power return and switching logic to each transistor. The structure limits nozzles to be placed in linear rows on either side of the ink jet supply slot. The patent uses both power supply and return lines, increasing the complexity of the device.

U.S. Pat. No. 5,134,425 discloses a passive two-dimensional array of heater resistors. The structure and arrangement of the droplet generators is not disclosed. The patent discloses the problem of power cross talk between resistors in two-dimensional arrays of heater resistors. Voltages firing a resistor also apply partial voltages across unfired resistors. The parasitic voltage increases as the number of rows is increased to a maximum of 5 rows. The patent applies partial voltages on certain lines to reduce the voltage cross talk. The partial energy does not eject a droplet, but maintains a common elevated temperature for both fired and unfired nozzles. Passive matrix arrays of resistors are limited in the depth of the array because of the parasitic resistance. The patent suggests that the number of rows is limited to less than five rows.

U.S. Pat. No. 6,921,156 discloses forming inkjet heads on non-silicon flat-panel substrates. Thin film transistors are coupled to an array of ink jet drop generators. The monolithic substrate is described as being made of any suitable material (preferably having a low coefficient of expansion) and discloses a preferred embodiment of being ceramic. The device is multiplexed driven using flip chip devices bonded to conductors using solder. Ink feed channels supply two rows of nozzles. The resistors and chambers are formed using thin film processes. Multiple feedholes can supply each ejector from a single, common manifold for the two rows of ejectors. Reference to the thin film transistors on the substrate is limited, describing them as driving the resistors. The thin-film devices are formed over barrier and/or smoothing layers to isolate the thin-film devices from the substrate.

U.S. Pat. No. 6,911,666 discloses a display on a flexible metal substrate. The patent discloses stainless steel, titanium, Inconel or Kovar alloys as possible substrates to support thin film transistors to drive OLED displays. The substrate thickness is in the range of 100 to 500 microns in thickness to create a flexible display. Via can be formed through a thick silicon oxide film that electrically isolates the thin film transistor from the conductive metallic substrate. Connections can be provided from the TFT to the substrate so that the substrate acts as part of an electrical circuit. No mention is made of what alloy operates optimally within the processing temperatures. Displays on non-silicon alloys do not require via through the substrate.

U.S. Pat. No. 6,663,221 discloses page wide ink jet printing. The substrate is pagewide, described as being more than 4 inches wide. The substrate can be formed of metal, such as stainless steel, ceramic, glass or resinous material such as polyimide. A nozzle array is formed on a first surface and supplied with ink from a bore formed through the substrate. Actuating elements and drive circuitry are formed on the surface of the substrate supporting the nozzle array. The suggested drive circuit is formed using thin film transistors. No process is described for forming the ink channel through the substrate.

U.S. Pat. No. 4,528,070 discloses a method for manufacturing an orifice plate. The patent cites prior art that used copper substrates and metallic masks on both sides of the wafer to form a passage through the substrate. Crystalline nickel was used previously as the metal mask for etching through copper substrates. The patent is directed to etching though more durable substrates, such as stainless steel, titanium zirconium and titanium. The patent discloses the use of electroplated nickel or cobalt having phosphorous as masks on both sides of the improved substrate materials. Etching is done by masking and etching though both surfaces of the substrate. No other structures are formed on the nozzle plate.

It would be useful to have an inkjet printhead and a method for forming an inkjet printhead on a metallic substrate. Additionally, it would be useful if the method created accurately aligned structures and efficiently etched ink supply channels through the substrate.

SUMMARY OF THE INVENTION

According to one aspect of the present invention, a method of forming an ink feed passage through a print head substrate includes providing a metallic substrate having a first surface and a second surface; providing an ink ejector structure on a first surface of the metallic substrate; providing a mask over the second surface of the metallic substrate to define the ink feed passage; and forming the ink feed passage from the second surface of the metallic substrate using a liquid etchant.

According to another aspect of the present invention, a method of forming a print head substrate includes providing a metallic alloy layer having a coefficient of thermal expansion; providing an isolation layer in contact with the metallic alloy layer, the isolation layer having a coefficient of thermal expansion that is substantially equivalent to the coefficient of thermal expansion of the metallic alloy layer; and curing the metallic alloy layer and the isolation layer by heating to over 200° C., wherein a negligible amount of thermally induced stress exists between the metallic alloy layer and the isolation layer.

According to another aspect of the present invention, a print head substrate includes a metallic alloy layer having a coefficient of thermal expansion and an isolation layer in contact with the metallic alloy layer. The isolation layer has a coefficient of thermal expansion that is substantially equivalent to the coefficient of thermal expansion of the metallic alloy layer such that a negligible amount of thermally induced stress exists between the metallic alloy layer and the isolation layer.

BRIEF DESCRIPTION OF THE DRAWINGS

In the detailed description of the example embodiments of the invention presented below, reference is made to the accompanying drawings, in which.

Figure 8A:
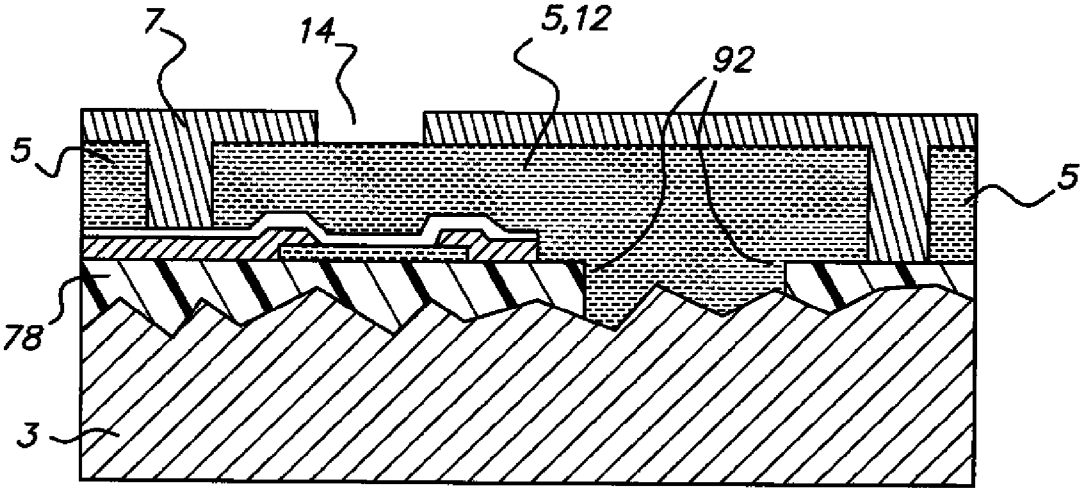
Figure 8B:
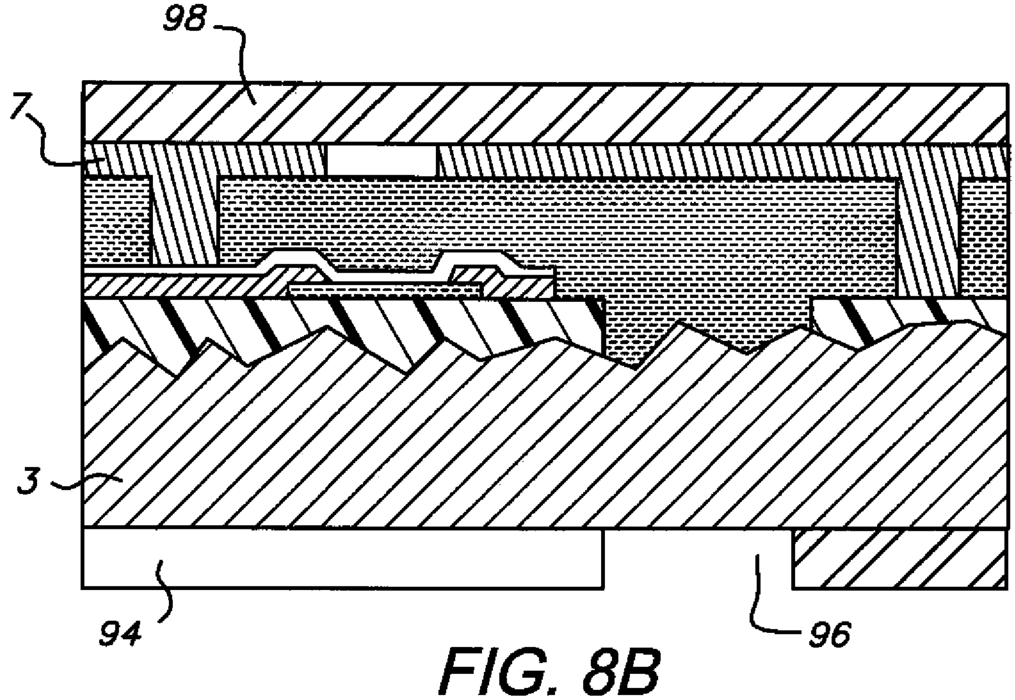
Figure 8C:
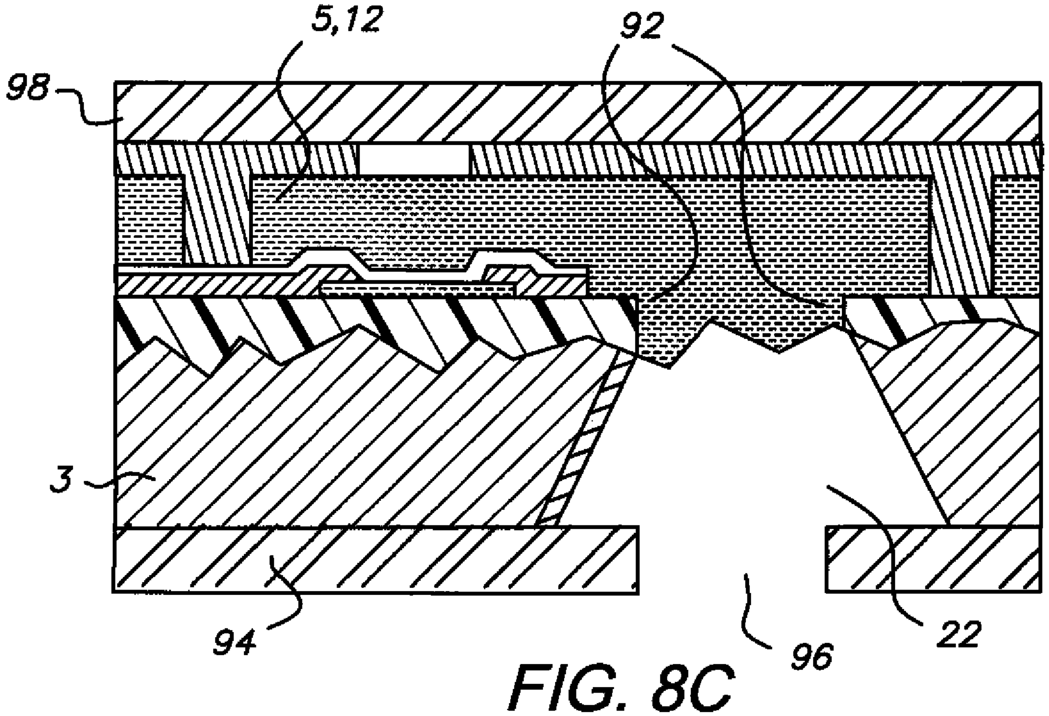
Figure 8D:
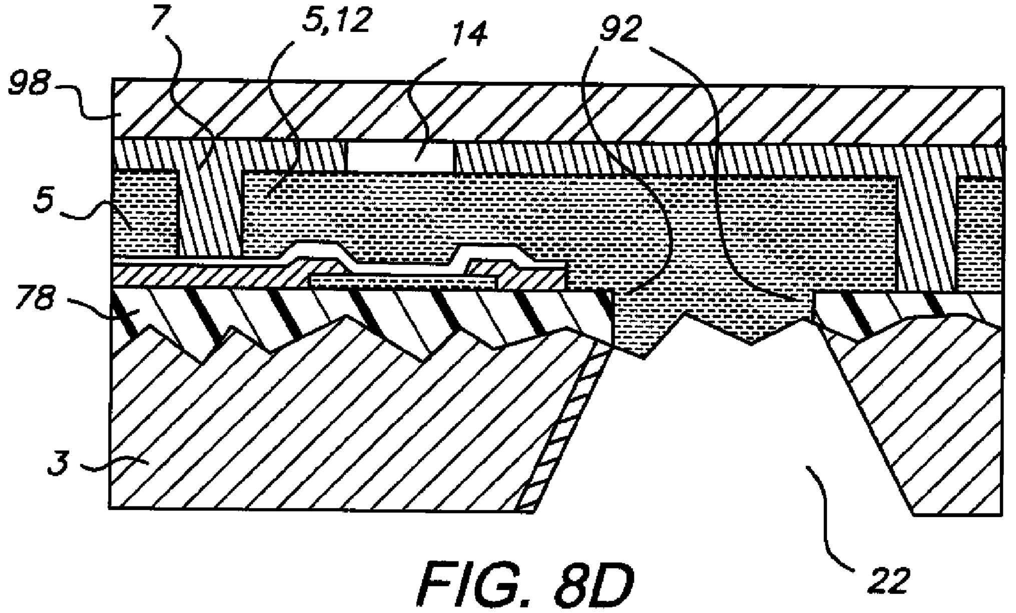
Figure 9:
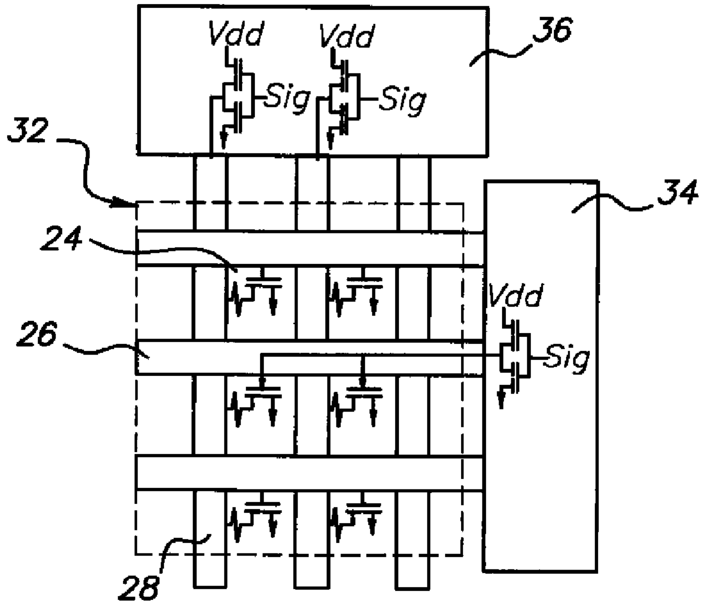
Figure 10:
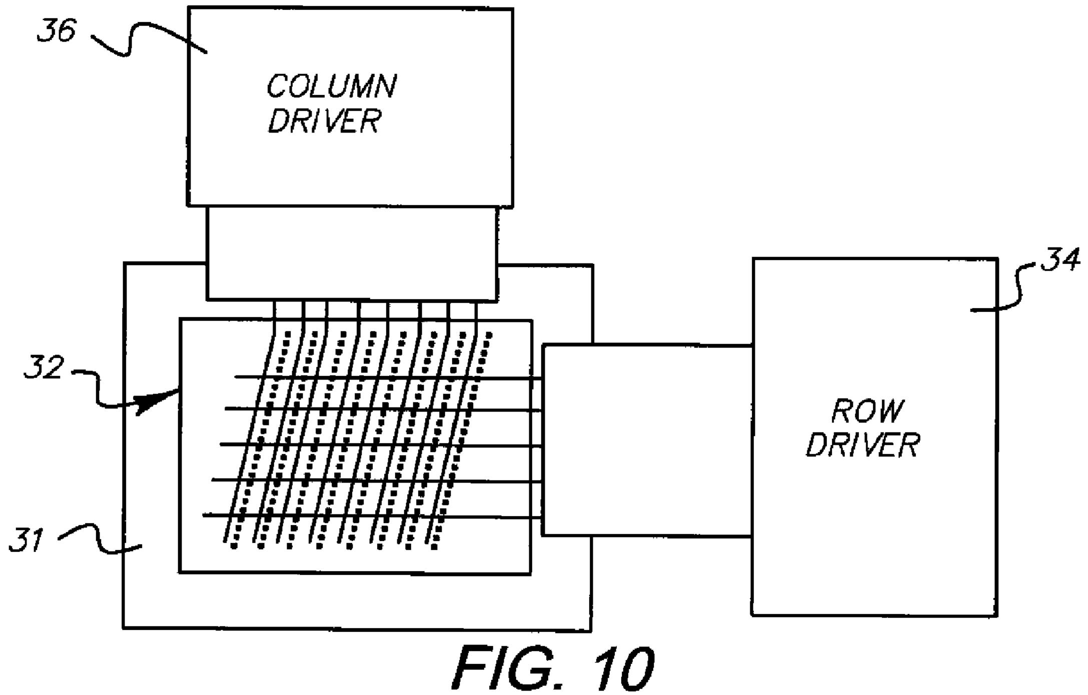
Figure 11:
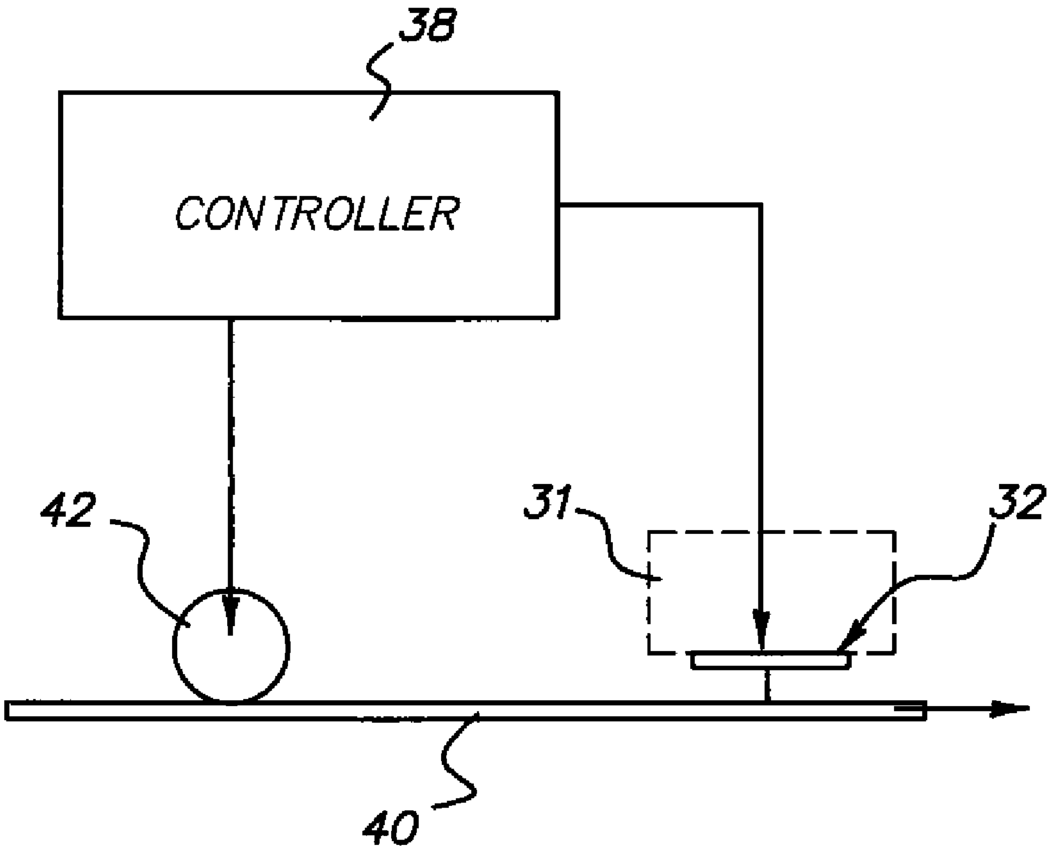

FIG. **8*a*** is a side sectional view of a device being constructed in accordance with the invention;

FIG. **8*b* is a side sectional view of the device shown in FIG. 8*a*** after backside masking;

FIG. **8*c* is side sectional views of the device shown in FIG. 8*b*** after ink feed passage etch;

FIG. **8*d* is a side sectional view of the device shown in FIG. 8*c*** after etch;

FIG. **8*e* is a side sectional view of the device shown in FIG. 8*d*** after chamber clearing;

FIG. 9 is an electrical schematic of an inkjet head in accordance with the present invention;

FIG. 10 is a schematic view of a head assembly in accordance with the present invention; and FIG. 11 is a side view of a printer using a head in accordance with the present invention.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
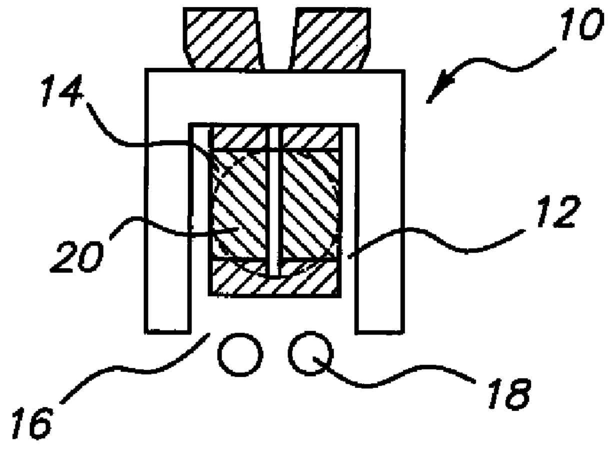
FIG. 1 is a top schematic view of an ejector in accordance with the present invention.
Figure 2:
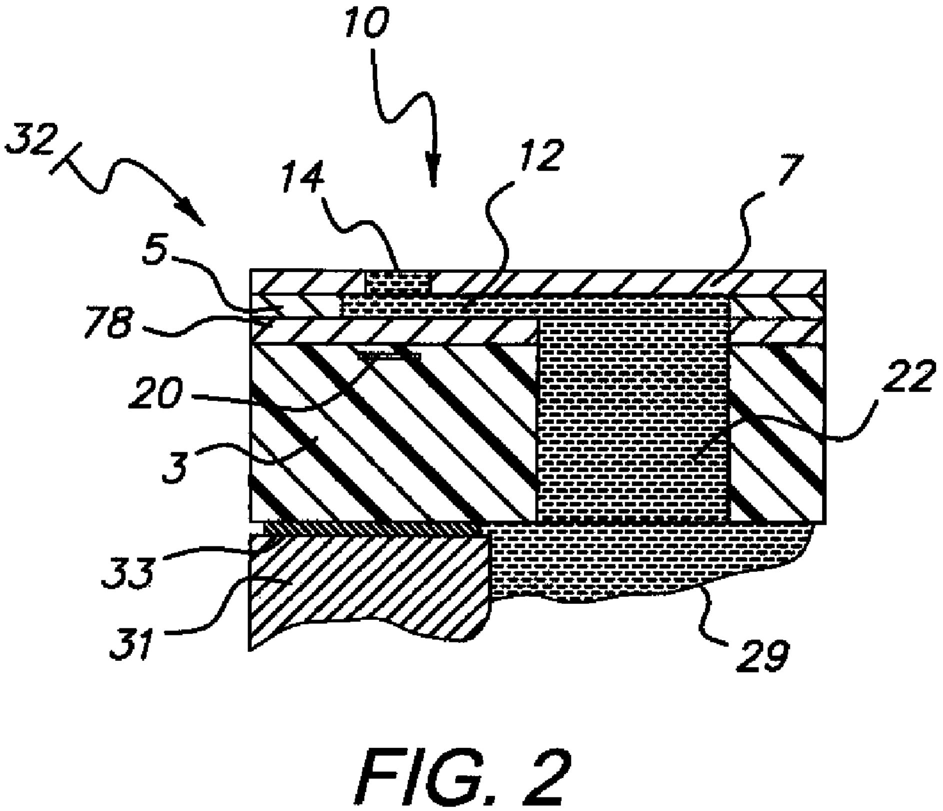
FIG. 2 is a side sectional view through the ejector shown in FIG. 1.

FIG. 1 is a top schematic view of an ejector 10 in accordance with the present invention. FIG. 2 is a side sectional view through the ejector shown in FIG. 1. Substrate 3 is formed of a metallic alloy. A polymer layer 5 is patterned to create an ink chamber 12 to hold a printing ink. A nozzle layer 7 over ink chamber 12 can be formed directly over polymer layer 5 using a vacuum deposited ceramic, polymer or metal.

Nozzle layer 7 over ink chamber 12 can also be a separate plate formed of ceramic, polymer or metal that is bonded to the polymer layer 5 defining ink chamber 12. Nozzle layer 7 has an opening to form a nozzle 14 to direct an ejected droplet of ink in a specified direction when ink chamber 12 is pressurized.

The invention is directed to forming drop on demand (DOD) inkjet ejectors using flat panel display (FPD) manufacturing processes. FPD manufacturing has the advantage of forming microelectronic devices over large areas at costs lower than devices formed on mono-crystalline silicon wafers. FPD glass substrates are inexpensive and have transparency that is needed for displays operating on transmitted light. The majority of flat panel displays incorporates thin film transistor (TFT) driving and control circuitry over glass substrates.

Ejectors 10 use thermal energy to heat ink and form a gas bubble that expels ink through a directing orifice. The ink ejecting process requires energy for each ejection and a significant portion of the energy is retained within the ejecting structure. The heat must be dissipated into substrate 3 before a subsequent ejection event. A key property for a thermal DOD heads is the ability of substrate 3 to conduct heat from ejector 10. Currently, DOD thermal inkjet heads are built on silicon substrates that have a thermal conductivity of 124 W/m-k. This permits heat to be efficiently transferred away from ejector 10 and cooling of the ejector prior to a subsequent ejection event. Rapid cooling permits high frequency pulsing of the ejectors for fast printing. Display glass, such as Corning 1737 glass or Eagle glass, used in flat panel display manufacturing has thermal conductivity of 1.2 W/m-K, approximately one percent of the conductivity of monolithic silicon.

Glass etching can only be done using chemical solutions at slow rates. The etching process is isotropic, requiring a large area on the backside when etching and opening on the front side. The backside area increases as the thickness of substrate 3 increases in thickness. Glass is fragile, limiting the thickness of material that can be used in FPD processes to greater than 200 microns. Using a metal alloy foil for substrate 3 permits significantly higher thermal conductivity and faster discharge rates for a thermal ejector. Metal foils can be much thinner that 200 microns, down to 125 microns, permitting faster chemical etching through the substrate. The thinner foil reduces the etch area used on the rear of the wafer. Metal foils can be much thinner that 200 microns, down to 125 microns, permitting faster chemical etching through the substrate.

Polymers have been suggested as substrates to be used on FPD manufacturing equipment. Polymers have even lower thermal conductivities than display glass. Building thermal DOD inkjet heads on either glass or polymeric substrates creates inkjet heads with very slow firing speeds due to the low thermal conductivity.

In the invention, the thermal DOD substrate is metal alloy with thermal conductivity significantly greater than glass or polymers. Research on forming organic LED arrays on flexible substrates has looked at the use of stainless steel alloy 304 (SS 304) for flexible displays. Table 1 lists properties of metal alloys that have thermal conductivities ten times greater than glass. The thermal conductivity of SS 304 creates thermal DOD inkjet heads with faster firing rates than thermal DOD heads formed on other polymeric or glass substrates. Other metal alloys also have significantly higher thermal conductivities than glass or polymers.

TABLE 1

| MATERIAL | Coefficient of Thermal Expansion (CTE) | Thermal Conductivity |
|---|---|---|
| Silicon | 3.6 | 124.0 |
| Glass ($SiO_2$) | 4.0 | 1.1 |
| SS 304 | 17.8 | 16.2 |
| Invar 36 | 4.2 | 10.1 |
| Kovar | 5.1 | 17.3 |
| NILO Alloy 42 | 4.5-6.5 | 10.5 |
| | um/m-° C., 250° C. | W/m-°K |

Thin film transistors on alloys require an isolation layer 78 between the metal alloy and subsequent layers. Isolation layer 78 is formed of silicon dioxide and provides a surface that is smoother than the surface of substrate 3 and electrically isolated from substrate 3. Isolation layer 78 can be a silicon dioxide layer that is deposited by electron beam evaporation or by depositing a liquid organo-silane over the surface and baking out organic components. The preferred embodiment is to apply 5000 angstroms of an organo-silane liquid (spin-on-glass, SOG), such as Honeywell Accuglass T-5121B as isolation layer 78, which is then over-deposited with 2500 angstroms of evaporated SiO2.

Depositing the first layer as a fluid creates an optically smooth surface that fills in discontinuities in the surface of the metal foil. Metallic alloys can be mechanically rolled into foils 50 to 500 microns thick with a surface roughness of 1500 angstroms. In the exemplary embodiment, a 5,000 angstroms layer of the T-512B is applied over the metallic substrate to cover the roughness from the metallic alloy foil. The 5,000 angstroms of spin-on-glass is sufficient to smooth the 1,500 angstroms rough metal surface to semiconductor grade surfaces. As part of the curing process of the spin-on-glass, the substrate and isolation layer must be raised to a temperature of 250 degrees centigrade to form a stable layer.

Alloys that do not match the COE of the spin-on-glass will curl after the heating process. Wafers with thermal stress-induced curl are difficult to process, and may require carrier wafers and attachment processes. The SEMI standard M1.8-89 for wafers 150 nm um diameter is 50 microns of bow. Wafers must have less than maximum bow to be processed on automated equipment. Metal alloy wafers should meet this specification to be processed on automated equipment. In this sense, a negligible amount of thermally induced stress needs to exist between the metallic alloy layer and the isolation layer in order to meet bow standards and be processed on automated equipment.

In order to ensure that a negligible amount of thermally induced stress exists between the metallic alloy layer and the isolation layer, the isolation layer must have a coefficient of thermal expansion that is substantially equivalent to the coefficient of thermal expansion of the metallic alloy layer. For example, referring back to Table 1, the coefficient of thermal expansion (COE) of SS 304 is four times that of the COE of a glass isolation layer. This difference induces excessive bow in thin metal wafers which makes SS 304 unsuitable for use when forming an inkjet printhead on a metallic substrate. However, still referring to Table 1, the COE of Invar 36, Kovar, and NILO Alloy 42, for example, is less than four times that of the COE of a glass isolation layer. This difference does not induce excessive bow in thin metal wafers which makes these alloys suitable for use when forming an inkjet printhead on a metallic substrate.

In an experiment, wafers NILO alloy 42 supporting a 5,000 angstrom thick cured spin-on-glass layer were found to have curl below the SEMI standard for a set of processing steps that generated thin film transistors at high temperature. Iron can be alloyed with various concentrations of nickel or other metals to create various coefficients of thermal expansion. In general, a set of layers formed over a metallic substrate at high temperature can induce a given stress within the wafer. In general, the metallic alloy should have a CTE that matched CTE of the composite layers to minimize warp in the wafer.

A heater resistor 20 lies over an isolation layer 78 on substrate 3. A pulse of electrical energy to heater resistor 20 causes ink within ink chamber 12 to momentarily be converted into a gaseous state. A gas bubble is formed over heater resistor 20 within ink chamber 12, and pressurizes ink chamber 12. Pressure within ink chamber 12 acts on ink within ink chamber 12 and forces a droplet of ink to be ejected through nozzle 14. Inlet 16 supplies ink to ink chamber 12. Restriction 18 can be formed at inlet 16 to improve firing efficiency by restricting the majority of the pressure pulse to ink chamber 12. Restriction 18 can be in the form of one or more pillars formed within inlet 16, or by a narrowing of the sidewalls in polymer layer 5 at inlet 16 of ink chamber 12.

Heater resistor 20 and associated layers are formed over isolation layer 78, followed by polymer layer 5. Polymer layer 5 is patterned, followed by nozzle layer 7, which is patterned to form nozzle 14. After those layers have been formed ink feed passage 22 can be formed through substrate 3 to supply ink to ejector 10. Processes used to form feed passage 22 must not induce stress into substrate 3 neither should they damage the ejectors 10. Substrate 3 is bonded to head holder 31 that has one or more cavities for supplying ink to some or all of ejectors 10 formed on substrate 3.

In one embodiment, electrical current used to power resistors 20 is returned through substrate 3. Head holder 31 is formed of an electrically conductive metal with the same CTE as the metal used in substrate 3. In the case that substrate 3 is formed of NILO alloy 42, then head holder 31 should be formed of the same material. The common CTE permits high temperature cure when bonding head holder 231 to substrate 3. An electrically conductive adhesive 33 can provide an electrical path between the two components. Conductive adhesive 33 should have low electrical resistance, less than 0.1 ohms resistance, to current flow between head holder 31 and substrate 3. Alternatively, power can be removed from substrate 3 using contacts along the perimeter of substrate 3. Each ejector 10 is fed by a cavity in head holder 31 through its ink feed passage 22 in substrate 3. Individual ink feed passages 22 are associated with individual ejectors 10 and are physically separated from other ejectors 10 by the material forming substrate 3.

Figure 3:
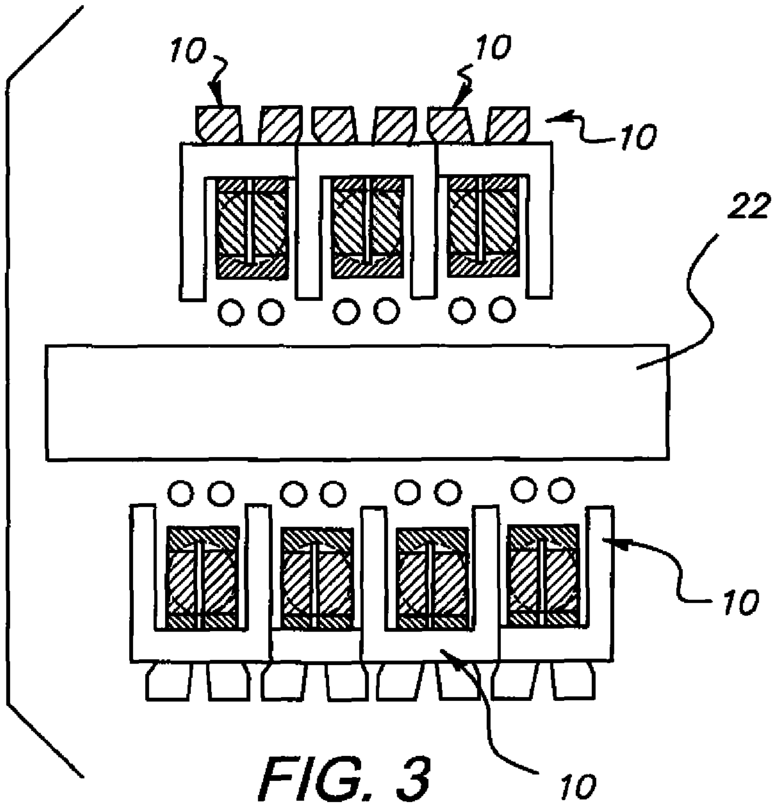
FIG. 3 (PRIOR ART)
FIG. 3 is a top view of an array of ink ejectors according to prior art.

FIG. 3 is a top view of an array of ink ejectors according to prior art. Ejectors 10 must be supplied by ink from the rear side of substrate 3. U.S. Pat. No. 6,722,759 is an excellent recitation of prior art associated with thermal drop-on-demand print heads. Ejectors 10 are arranged in two closely packed rows that share common ink feed passage 22. Ink feed passage 22 passes through substrate 3, which supplies to ink to multiple ejectors 10. Arranging two linear rows of ejectors 10 on either side of ink feed passage 22 provides for a compact ink jet head. Because the nozzles are adjacent to each other, fluidic cross-talk can occur between ejectors 10. Close packing of the nozzles makes the head susceptible to thermal cross talk between adjacent nozzles. Overheating can become more pronounced if substrate 3 is not silicon, but a less thermally conductive material such as metal alloy, glass, ceramic or polymer. It is useful then to separate individual ejectors in accordance with this invention.

Figure 4:
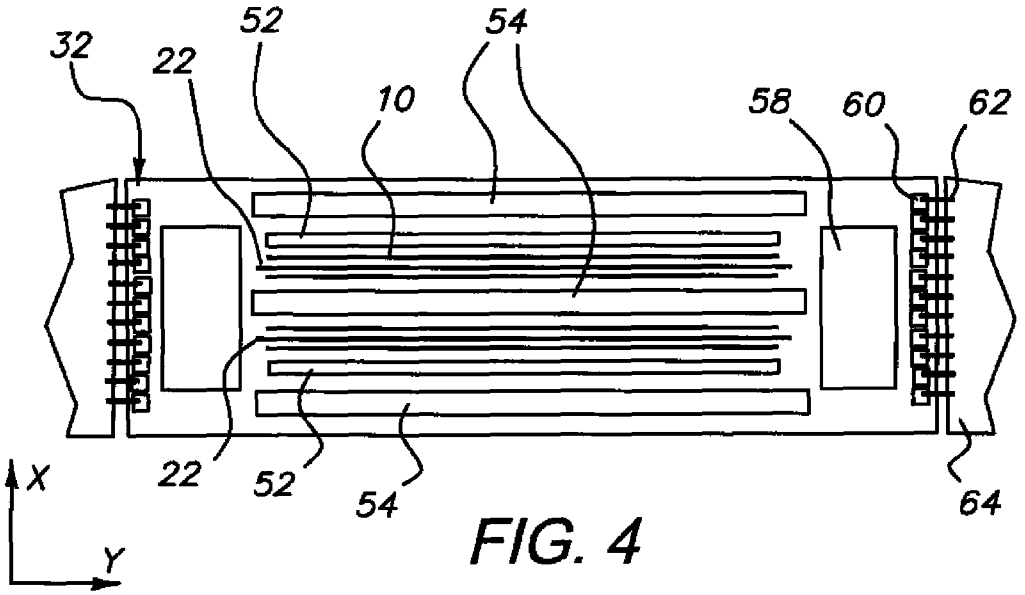
FIG. 4 (PRIOR ART)
FIG. 4 is a top view of an inkjet print head assembly in accordance with prior art.

FIG. 4 is a top view of an inkjet print head in accordance with prior art. The recitation again generally follows the structures found in U.S. Pat. No. 6,722,759. A print head 32 has two ink feed passages 22, each feed passage feeding two rows of ejectors 10. A set of ejector drivers 52 is formed adjacent to each row of ejectors 10. Each ejector driver 52 is a semiconductor-switching element that is attached to each heater resistor 20 within each ejector 10. The power requirements for thermal drop on demand inkjet are high, typically over 1 watt of power for approximately 1 microsecond. Ejector drivers 52 are typically formed of PMOS or NMOS transistors that are diffused into a silicon substrate 3. Ejector drivers 52 are activated to electively apply power to heater resistors 20. Prior art discloses that ejector drivers 52 can also be thin-film-transistor elements having characteristics capable of meeting the power and switching times required to thermally eject a droplet from an ejector 10.

Power to ejector drivers 52 is provided by conductor lines 54 disposed on the sides and down the center of substrate 3. Conductor lines 54 supply power and data for ejector drivers 52. Control logic 58 is disposed on both sides of the substrate 3 to decode data signals from printer controller 38 (not shown in figure). Data and power are delivered to control logic 58 through bond pads 60. Wire bonds 62 provide connection between bond pads 60 on substrate 3 and flex circuit 64. Data from control logic 58 is delivered through flex circuit 64 through wire bonds 62 to control logic 58. Control logic 58 responds to control data from printer controller 38 (not shown in this figure).

Figure 5:
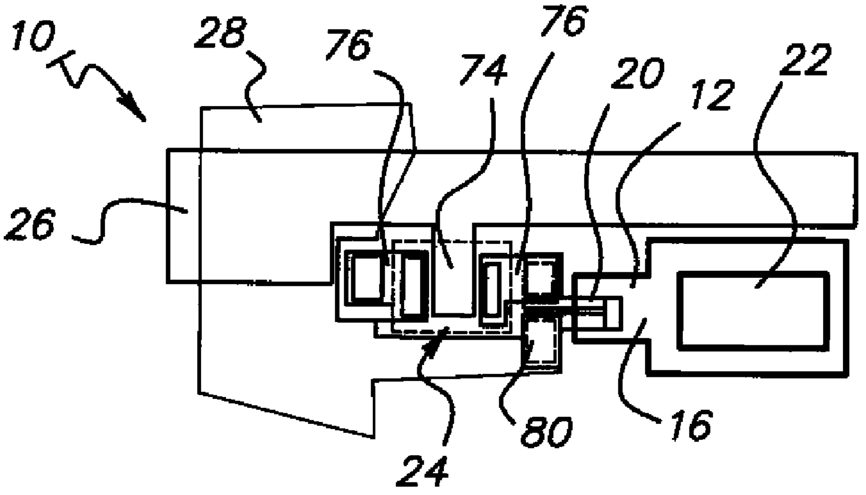
FIG. 5 is a top view of an ejector in accordance with the present invention.

FIG. 5 is a top schematic view of an ejector in accordance with the present invention. In the invention, an ejector 10 comprises an ink chamber 12 actuated by heater resistor 20. Ink chamber 12 is fed by inlet 16 and ejects fluid through nozzle 14 (not shown) over resistor 20. Dedicated ink feed passage 22 is integral with ejector 10. Ink feed passage 22 shares a common cavity in head holder 31 facing the back of substrate 3. Ejector 10 in accordance with the invention provides a complete assembly that can be positioned at any distance from adjacent ejectors 10 to eliminate fluidic cross talk and improve cooling efficiency. In the case that substrate 3 is not silicon, the greater distance prevents overheating that would result from closely spaced ejectors 10 on lower conductivity substrates 3.

U.S. Pat. No. 5,134,425 discloses a passive two-dimensional array of heater resistors. The patent discloses the problem of power cross talk between resistors in two-dimensional arrays of heater resistors. A voltage applied to one resistor applies partial voltages across unfired resistors, significantly increasing the current and power demand. In the present invention, a three-terminal device, generally referred to as a transistor 24, permits multiple ejectors 10 to be attached to a matrix of row conductors 26 and column conductors 28 and eliminates power cross talk. Row conductor 26 provides a digital logic signal to gate power supplied by column conductor 28. In this way, transistors 24 provide both a power and logic multiplexing using either row conductor 26 or column conductor 28 to provide power to resistor 20 when a gating voltage is applied on the other conductor. Transistors 24 and individual ink feed passages 22 permit ejectors 10 to be organized on substrate 10 in large numbers of both columns and rows that are separated for thermal efficiency on non-silicon substrates.

Figure 6:
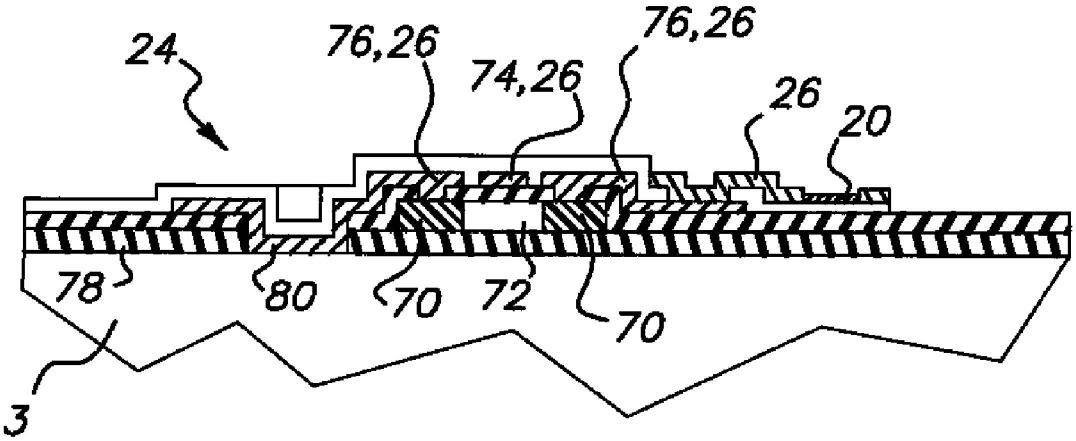
FIG. 6 is a side sectional view of a transistor on a substrate in accordance with the invention.

Transistor 24 can be arranged over isolation layer 78 over substrate 3 and be formed by a plurality of thin film material layers. FIG. 6 is a side sectional view of transistor on a substrate in accordance with the invention. Because substrate 3 is metallic, semiconductor devices cannot be formed directly in the substrate. In the example, transistors 24 are thin-film transistors formed over isolation layer 78 over substrate 3. Two doped areas 70 provide pools of charge in a semiconductor material, such as polysilicon. Channel 72 is disposed between doped areas 70 and is responsive to a field applied to gate electrode 74. The presence of a field on gate electrode 74 permits current to flow between doped areas 70. Various levels and types of n or p dopants can be applied to doped areas 70 and channel 72 to change the characteristics of transistor 24. Transistor contacts 76 are applied through isolation layer 78 to supply power through transistor 24. In the invention, transistor contacts 76, for example, a first electrical contact and a second electrical contact, are formed of the material comprising row conductors 26 to minimize layers.

In the exemplary embodiment, gate electrode 74 and transistor contacts 76 are isolated areas of the material providing row conductor 26. An opening is made through isolation layer 78 to provide substrate contact 80 between one transistor contact 76 and substrate 3. In the invention, two of the device terminals provide switching and power means, which are through gate electrode 74 and the transistor contact 76 not connected to substrate 3. The power return is through the substrate using substrate contact 80. In the invention, it is important that the substrate provide sufficient conductivity that the power delivered to multiple ejectors 10 be transmitted through substrate 3. The conductivity can be provided by a metallic alloy, but not by glass or polymeric substrates. In the case of very wide heads, the number of ejectors can be large, and applied power can be high. Substrate 3 is formed of metal and power is conducted through the substrate to eliminate additional conductors for power return. The structure permits row conductors 26 and column conductors 28 to be thin, and ejectors 10 can be packed closely together to minimize device cost.

Column conductors 28 are formed over isolation layer 78 and have through via to connect to isolated areas of conductor 26 that forms a transistor contact 76 to complete the circuit. The structure of the matrix electrical backplane of the invention uses two metal layers spaced from substrate 3 by isolation layer 78 and spaced from each other by isolation layer 78. The structure provides a logic and power matrix inkjet array backplane with a minimal number of layers.

Figure 7:
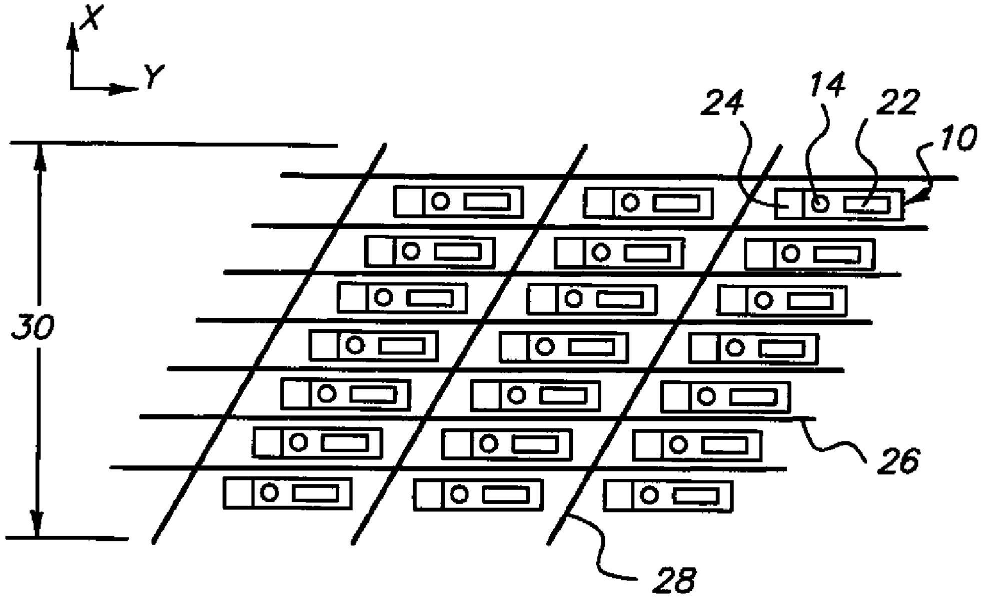
FIG. 7 is a schematic representation of an ejector array in accordance one example embodiment of the invention.

FIG. 7 is a schematic representation of an ejector array in accordance one example embodiment of the invention. A coordinate system is shown and includes a first direction X with X an axis of motion between the printhead and an ink-receiving surface, commonly referred to as a printing direction. A second direction Y is also shown with Y being a cross printing direction. A direction Z is also shown with Z being a direction perpendicular to the printhead. This is commonly referred to as the direction of ink drop ejection from the printhead.

Ejectors 10 are shown schematically as a box having individual supply ports 22 and nozzles 14 and transistors 24. Ejectors 10 have been attached to a matrix of row conductors 26 and column conductors 28 to form laterally staggered columns of ejectors 10. Each ejector 10 of a column of ejectors is staggered at a desired pitch, typically expressed in dpi or microns, which is finer than the pitch of the ejector columns. For example, each column can be pitched 600 microns apart due to the area required for each ejector. If the required printing pitch is 40 microns, each ejector in the column can be laterally staggered 40 microns to a depth of 15 ejectors (40×15=600) to achieve the required 40 micron printing pitch. The invention permits the staggered matrix array to be placed on a single substrate. Transistors 24 attached to ejectors 10 using row conductors 26 as the gate lines and column conductors 28 as power supply lines permit thermal Drop-On-Demand print heads having a large number of rows along printing direction X with close packing.

The embodiment shown in FIG. 7 is particularly well suited for print heads having large area arrays, for example, print heads having a print width across the Y direction of over of 100 millimeters and a print depth dimension Y of 18 millimeters. However, the large area array print head can have other length and width dimensions. One head (or a plurality of large area array print heads stitched together) can be used to form a pagewide print head. In a pagewide print head, the length of the printhead is preferably at least equal to the width of the receiver and does not "scan" during printing. The length of the page wide printhead is scalable depending on the specific application contemplated and, as such, can range from less than one inch to lengths exceeding twenty inches.

FIGS. 8*a*-8*e* are sectional views of a device being constructed in accordance with the invention. FIG. 8*a* is a side sectional view of a device at the beginning of the ink feed passage etch process. Layers forming transistors 24, heater resistors 20, row conductors 26 and column conductors have been formed on a first surface of substrate 3. Isolation layer 78 is been etched prior to the application of polymer layer 5 to expose metallic substrate 3 through clear area 92. Clear area 92 will open into ink fed slot 22 that will be formed through substrate 3. Polymer layer 5 has been patterned to provide a block of material filling in an area that will correspond to ink chamber 12. Polymer layer 5 can be a photo-imaged epoxy or an oxygen-plasma etched layer of polyimide. Nozzle layer 7 has been applied over polymer layer 5 and a nozzle 14 has been formed in nozzle layer 7. Nozzle layer 7 can be formed of a photo-imaged epoxy, a plasma-enhanced chemical vapor deposited layer of silicon dioxide or a metallic layer. Polymer layer 5 and nozzle layer 7 have the property that polymer layer 5 can be removed without harm to nozzle layer 7.

FIG. 8*b* is a side sectional view of a device after backside masking. An etch mask 94 is applied opposite to the surface carrying ejectors 10. The masking material can be a thick polymer layer, an evaporated dielectric layer or a metal layer or combinations thereof. Etch mask openings 96 are formed through etch mask 96 opposite clear area 92. Protective tape 98 is applied over the ejector surface of substrate 3. Protective tape 98 can be conventional "dicing tape" which is applied under pressure over microelectronic surfaces prevent damage during wafer dicing and backside grinding operations. Protective tape 98 can be released after operations by exposure to actinic ultraviolet radiation to degrade the attachment adhesive and release the inkjet head without damage to nozzle layer 7.

FIG. 8*c* is a side sectional views of a device after ink feed passage etch. In the invention, a conventional ferric chloride etching solution and circuit board processing equipment is used to etch feed passage 22 through substrate 3. An example solution is a 50% ferric chloride solution with 2% hydrochloric acid. The solution is effective in etching most iron, nickel or copper materials and alloys thereof. The etching solution is pumped against etch mask 94 to provide a continuous flushing of ink feed passage 22 during the etching process. The etching process is isotropic, being wider at the initial area and narrower at the area that opens at clear area 92, typically forming a tapered opening with a sidewall angle of about 30 degrees. Ejectors 10 are positioned apart from each other so that enough material in substrate 3 exists to form a mechanically sound structure for ejectors 3. Clear area 92 and etch mask opening 96 are adjusted in size to create an ink feed passage of approximately the same size as clear area 92. An important part of the invention is the presence of polymer 5 in the area that becomes chamber 12. The presence of the polymer provides a strong layer to resist the impact of the etching fluid at the end of etch as metal is removed away from clear area 92. Protective tape 98 protects the ejector-bearing surface of the device from damage during the etching process.

FIG. 8*d* is a side sectional view of a device after etch. Etch mask 94 is removed using a solvent wash to expose the back surface of substrate 3. In this embodiment, the area that becomes chamber 12 is filled with polymer 5. This can occur if polymer 5 is a solvent resistant epoxy or polyimide and etch mask 94 is a conventional photo-resist. This can occur if etch mask 94 is a metal and a metal solvent is used for removal. This condition can occur if etch mask 94 is a dielectric material that is removed with a fluorine plasma or chemical etch. In the case nozzle layer 7 is sensitive to processes that remove etch mask 94. Protective tape 98 is removed after etch mask 94 to protect nozzle layer 7.

Figure 8E:
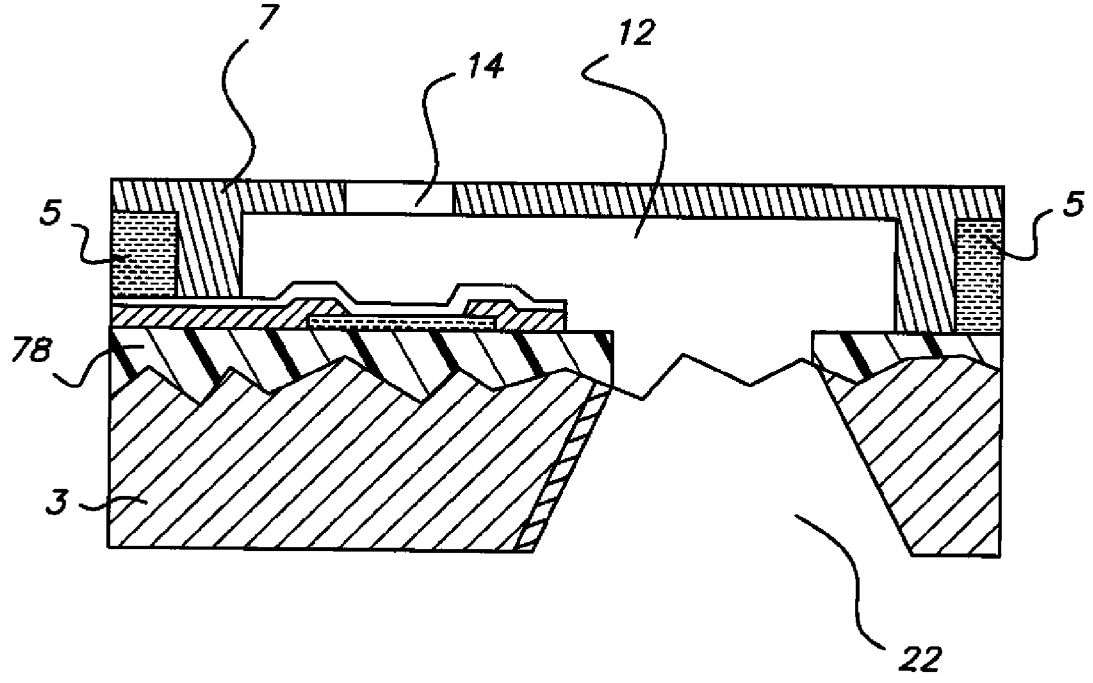

FIG. 8*e* is a side sectional view of a device after clearance of the ink chamber. Actinic ultraviolet radiation has been used to break down the adhesive that held protective tape 98 to the ejector-bearing surface of the device. In one case, a polymer layer 5 and polymeric etch mask 94 are removed by a common solvent to create chamber 12 and remove etch mask 94. In the case that nozzle layer 7 is an inorganic structure, formed of either a dielectric such a silicon dioxide or a metal such as nickel, polymer 5 can be removed by a plasma-oxygen etch. A device having an open chamber 12 is capable of passing ink through substrate 3 using ink feed passage 22 that is in connection with chamber 12.

A first part of the invention is the construction of a complete ejector surface on the front surface of substrate 3. A second part of the invention is providing a stress-free etch through substrate 3 using a metal solvent. Another part of the invention is filling chamber 12 with a polymer during the etching process. A final part of the invention is removal of etch mask 94 simultaneously with removal of the material filling chamber 12.

FIG. 9 is an electrical schematic of an ink jet head in accordance with the present invention. Print head 32 includes a plurality of drivers electrically connected to the plurality of row conductors and the plurality of column conductors. The plurality of drivers is operable to provide current to each resistive element row sequentially. In FIG. 9, each column conductor 28 is connected to a column driver 36. Column driver 36 can be, for example, an ST Microelectronics STV 7612 Plasma Display Panel Diver chip that is connected to each column conductor 28. The chip responds to digital signals to either apply a drive voltage or ground to each column conductors. Each row conductor 26 is connected to a row driver 34. Row driver 34 can be the same ST Microelectronics STV 7612 Plasma Display Panel Diver chip to provide either a gating voltage (Vdd) or ground to each row conductor 26. Transistor 24, provided with each ejector 10, responds to the logic and power states to permit print head 32 to be logically driven in a row sequential fashion without parasitic resistance effects.

Print head 32 is fired row sequentially. Digital signals apply a drive voltage (Vdd) or ground voltage to each column conductor 28. Column conductors 28 having an applied drive voltage provide energy to the ejector attached to column conductor 28 and the grounded row conductor 26. Column conductors 28 at ground voltage are not fired. Row driver 34 applies a Gate voltage (Vdd) to a row of ejectors 10 to enable firing of powered ejectors 10 of a given row, while the remaining rows remain at ground voltage regardless of power applied to their associated column conductor 28. This process is repeated to apply an image wise pattern of ink droplets from print head 32.

Only a single ejector 10 on any given column conductor 28 is active at any one time, which permits column conductor 28 to be thin. However, all ejectors 10 on the selected row conductor 26 can be fired, which represents a large amount of current and power that must be returned through substrate 3. In a head having thirty activated heater resistors 20 on a line, each sinking 50 milli-amperes, 1.5 amps will pass through substrate 3. Power from each ejector 10 must pass through contact 80, substrate 3 and through conductive adhesive 33 in the case that power is transmitted through head holder 31. The edges of substrate 3 can provide a large amount of surface area to transmit the power, in particular wide print heads will have large contact areas that will scale with width.

FIG. 10 is a schematic view of a head assembly in accordance with the present invention. Print head 32 has been mounted to head holder 31, which holds a supply of ink in a cavity behind substrate 3 to supply ink through substrate 3 to ejectors 10 mounted on the front of substrate 3. Row driver 34 and column driver 36 are attached to head holder 31 and wire bonds are made between the flex circuit for the drivers to the row and column conductors on print head 32. The width of the head is not limited to a single column driver 36. The width can be extended and additional column drivers 36 added to provide power to additional columns.

FIG. 11 is a schematic side view of a printer using a head in accordance with the present invention. Controller 38 moves an ink receiver 40 using receiver driver 42. Receiver driver 42 is a motor that operates on a plate or roller to drive ink receiver 40 under print head 32. Controller 38 provides drive signals to row driver 34 and column driver 36 connected to print head 32 to apply an image-wise pattern of ink droplets onto ink receiver 40 in synchronization with the motion of ink receiver 40.

The invention has been described in detail with particular reference to certain preferred embodiments thereof, but it will be understood that variations and modifications can be effected within the scope of the invention.

PARTS LIST

3 substrate
5 polymer layer
7 nozzle layer
10 ejector
12 ink chamber
14 nozzle
16 inlet
18 restriction
20 heater resistor
22 ink feed passage
24 transistor
26 row conductor
28 column conductor
30 spacing distance
31 head holder
32 print head
33 conductive adhesive
34 row drivers
36 column drivers
38 printer controller
40 ink receiver
42 receiver driver
52 ejector drivers
54 conductor lines

58 control logic
60 bond pads
62 wire bonds
64 flex circuit
70 doped areas
72 channel
74 gate electrode
76 transistor contacts
78 isolation layer
80 substrate contact
92 clear area
94 etch mask
96 etch mask opening
98 protective tape

What is claimed is:

1. A method of forming an ink feed passage through a print head substrate comprising:

providing a metallic substrate having a first surface and a second surface;

providing an ink ejector structure on the first surface of the metallic substrate;

providing a mask over the second surface of the metallic substrate to define the ink feed passage; and forming the ink feed passage from the second surface of the metallic substrate by pumping a liquid etchant against the mask that is over the second surface of the metallic substrate.

2. The method of claim 1, wherein providing the ink ejector structure on the first surface of the metallic substrate comprises:

providing an isolation layer between the first surface of the metallic substrate and the ink ejector structure; and patterning the isolation layer prior to forming the ink feed passage.

3. The method of claim 1, the ink ejector structure including a liquid chamber including a sacrificial material, further comprising:

removing the mask and the sacrificial material simultaneously.

4. The method of claim 3, the mask and the sacrificial material are organic polymers, wherein removing the mask and the sacrificial material simultaneously includes using an organic solvent etchant.

5. The method of claim 3, the mask and the sacrificial material are organic polymers, wherein removing the mask and the sacrificial material simultaneously includes using a plasma oxygen etchant.

6. The method of claim 1, wherein providing the ink ejector structure on the first surface of the metallic substrate includes providing an ink ejector structure including at least one of drive electronics, a resistor, a chamber layer, and a nozzle layer.

7. The method of claim 1, wherein the metallic substrate includes one of iron, nickel, and combinations thereof, and the liquid etchant includes ferric chloride.

8. The method of claim 1, the metallic substrate including a metallic alloy having a coefficient of thermal expansion, the method further comprising:

providing an isolation layer in contact with the metallic alloy of the metallic substrate in between the metallic substrate and the ejector structure, the isolation layer having a coefficient of thermal expansion that is substantially equivalent to the coefficient of thermal expansion of the metallic alloy; and curing the isolation layer by heating to over 200° C. prior to providing the ink ejector structure on the first surface of the metallic substrate, wherein a negligible amount of thermally induced stress exists between the metallic alloy layer and the isolation layer.

9. The method of claim 1, wherein providing the ink ejector structure on the first surface of the metallic substrate comprises:

depositing a polymer layer on the first surface of the metallic substrate;

patterning the polymer layer;

depositing a nozzle layer over the patterned polymer layer;

forming a nozzle in the nozzle layer;

removing the mask and the polymer layer simultaneously, wherein removing the polymer layer creates a liquid chamber.

10. The method of claim 9, the mask being an organic polymer, wherein removing the mask and the polymer layer simultaneously includes using an organic solvent.

11. The method of claim 9, the mask being an organic polymer, wherein removing the mask and the polymer layer simultaneously includes using a plasma oxygen etchant.

12. A print head substrate comprising:

a metallic alloy layer having a coefficient of thermal expansion; and an isolation layer in contact with the metallic alloy layer, the isolation layer having a coefficient of thermal expansion that is substantially equivalent to the coefficient of thermal expansion of the metallic alloy layer, wherein a negligible amount of thermally induced stress exists between the metallic alloy layer and the isolation layer, wherein the isolation layer includes one of siloxane based glass and spin on based glass.

13. The substrate of claim 12, wherein the metallic alloy layer includes 42 percent nickel.

14. The substrate of claim 12, further comprising:

additional layers for ejecting liquid from the print head.

* * * * *